(12) United States Patent
Xu et al.

(10) Patent No.: US 10,875,128 B2
(45) Date of Patent: Dec. 29, 2020

(54) PRE-SINTERED PREFORM BRAZE FOR JOINING ALLOY CASTINGS

(71) Applicant: Rolls-Royce Corporation, Indianapolis, IN (US)

(72) Inventors: Raymond Ruiwen Xu, Carmel, IN (US); Scott Nelson, Carmel, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 15/151,185

(22) Filed: May 10, 2016

(65) Prior Publication Data

US 2016/0339544 A1 Nov. 24, 2016

Related U.S. Application Data

(60) Provisional application No. 62/164,285, filed on May 20, 2015.

(51) Int. Cl.

| | | |
|---|---|---|
| C21D 9/50 | (2006.01) |
| B23K 35/30 | (2006.01) |
| B23K 1/00 | (2006.01) |
| B23K 35/02 | (2006.01) |
| B22F 7/08 | (2006.01) |
| C22C 1/04 | (2006.01) |
| C22C 19/05 | (2006.01) |
| B32B 15/01 | (2006.01) |

(52) U.S. Cl.
CPC .............. *B23K 35/304* (2013.01); *B22F 7/08* (2013.01); *B23K 1/0018* (2013.01); *B23K 35/0222* (2013.01); *B23K 35/0244* (2013.01); *B23K 35/3033* (2013.01); *B23K 35/3046* (2013.01); *C22C 1/0433* (2013.01); *C22C 19/057* (2013.01); *B32B 15/01* (2013.01); *B32B 2305/80* (2013.01); *B32B 2311/22* (2013.01); *C21D 9/50* (2013.01)

(58) Field of Classification Search
None
See application file for complete search history.

(56) References Cited

U.S. PATENT DOCUMENTS

| | | | |
|---|---|---|---|
| 3,390,986 A | 7/1968 | Stenerson | |
| 4,209,348 A | 6/1980 | Duhl et al. | |
| 4,611,752 A | 9/1986 | Jahnke | |
| 4,614,296 A | 9/1986 | Lesgourgues | |
| 4,940,566 A | 7/1990 | Wood et al. | |
| 5,332,360 A | 7/1994 | Correia et al. | |
| 5,395,584 A * | 3/1995 | Berger | B23K 35/304 228/119 |
| 5,732,468 A | 3/1998 | Galley et al. | |
| 5,797,725 A | 8/1998 | Rhodes | |
| 6,003,754 A | 12/1999 | Rhodes | |
| 6,195,864 B1 | 3/2001 | Chesnes | |
| 6,325,871 B1 | 12/2001 | Burke et al. | |
| 6,454,885 B1 * | 9/2002 | Chesnes | B22F 1/0003 148/528 |
| 6,579,061 B1 | 6/2003 | Heyward et al. | |
| 6,951,112 B2 | 10/2005 | Czachor | |
| 7,343,676 B2 | 3/2008 | Ng | |
| 7,506,793 B2 | 3/2009 | Sathian | |
| 7,653,994 B2 * | 2/2010 | Dasilva | B22F 7/062 29/889.1 |
| 7,845,549 B2 | 12/2010 | Budinger | |
| 8,087,565 B2 * | 1/2012 | Kottilingam | B23K 1/001 228/119 |
| 8,356,409 B2 | 1/2013 | Perret | |
| 8,449,249 B2 | 5/2013 | Suchezky | |
| 8,685,314 B2 | 4/2014 | Tuppen et al. | |
| 8,703,044 B2 | 4/2014 | Sathian et al. | |
| 9,863,249 B2 | 1/2018 | Shinn et al. | |
| 10,076,811 B2 * | 9/2018 | Ozbaysal | B23P 6/045 |
| 2002/0157737 A1 * | 10/2002 | Chesnes | B22F 1/0003 148/528 |
| 2005/0067061 A1 * | 3/2005 | Huang | B23K 35/3033 148/428 |
| 2007/0154338 A1 * | 7/2007 | Sathian | B23K 1/0018 419/5 |
| 2007/0163684 A1 * | 7/2007 | Hu | C22C 1/0433 148/528 |
| 2007/0284410 A1 | 12/2007 | Budinger | |

(Continued)

FOREIGN PATENT DOCUMENTS

| | | |
|---|---|---|
| DE | 102005059299 A1 | 6/2006 |
| DE | 102014226055 A1 | 6/2016 |

(Continued)

OTHER PUBLICATIONS

Pollock, et al., "Nickel-Based Superalloys for Advanced Turbine Engines: Chemistry, Microstructure, and Properties," Journal of Propulsion and Power, vol. 22, No. 2, Mar.-Apr. 2006, pp. 361-374.

(Continued)

*Primary Examiner* — Charles I Boyer

(74) *Attorney, Agent, or Firm* — Shumaker & Sieffert, P.A.

(57) ABSTRACT

The disclosure describes techniques for joining a first component comprising a first metal or alloy and a second component comprising a second metal or alloy to each other. The techniques may include positioning the first and second component adjacent to each other to define a joint region between adjacent portions of the first component and the second component. The techniques also may include positioning a pre-sintered preform (PSP) braze material in the joint region, heating the PSP braze material to form a molten braze alloy, and cooling the molten braze alloy to join the first and second components. The PSP braze material may include a wide gap braze material.

19 Claims, 6 Drawing Sheets

(56) References Cited

U.S. PATENT DOCUMENTS

| | | | | |
|---|---|---|---|---|
| 2010/0059573 A1* | 3/2010 | Kottilingam | ............ | B23K 1/001 228/164 |
| 2012/0231295 A1* | 9/2012 | Kottilingam | ......... | B23K 1/0056 428/680 |
| 2012/0308843 A1 | 12/2012 | Ott et al. | | |
| 2014/0154082 A1* | 6/2014 | Shinn | .................... | B23K 1/0018 416/191 |
| 2014/0369741 A1* | 12/2014 | Cui | ...................... | B23K 1/0018 403/271 |
| 2015/0090773 A1 | 4/2015 | Schick et al. | | |
| 2015/0367456 A1* | 12/2015 | Ozbaysal | ................. | B22F 5/009 419/8 |
| 2016/0177749 A1 | 6/2016 | Brandl et al. | | |
| 2016/0230576 A1 | 8/2016 | Freeman et al. | | |
| 2016/0250725 A1 | 9/2016 | Henderkott et al. | | |
| 2016/0339544 A1 | 11/2016 | Xu et al. | | |
| 2018/0031226 A1 | 2/2018 | Burchill et al. | | |

FOREIGN PATENT DOCUMENTS

| | | | |
|---|---|---|---|
| EP | 2078579 A1 | 7/2009 | |
| EP | 2713007 A1 | 4/2014 | |
| EP | 3095550 A1 | 11/2016 | |
| WO | 98/45491 A1 | 10/1998 | |
| WO | 2014/143963 A1 | 9/2014 | |
| WO | 2016096382 A1 | 6/2016 | |

OTHER PUBLICATIONS

Extended European Search Report from counterpart European Application No. 16168659.7, dated Aug. 16, 2016, 8 pp.

Response to Search Opinion dated Aug. 16, 2016, from counterpart European Application No. 16168659.7, filed May 12, 2017, 7 pp.

Search report and written opinion from counterpart Singaporean Patent application No. 10201603867S, dated Oct. 2, 2018, 8 pp.

Response to Examination Report dated Feb. 22, 2019, from counterpart European Application No. 16168659.7, filed May 13, 2019, 48 pp.

Response to Written Opinion dated Oct. 2, 2018, from Singaporean Application No. 10201603867S, filed Feb. 27, 2019, 19 pp.

Notice of Intent to Grant from counterpart Singaporean Application No. 10201603867S, dated Mar. 11, 2019, 6 pp.

Examination Report from counterpart European Application No. 16168659.7, dated Feb. 22, 2019, 6 pp.

U.S. Appl. No. 16/272,664, filed Feb. 11, 2019 by Raymond Ruiwen Xu et al.

Examination Report from counterpart European Application No. 16168659.7, dated Aug. 27, 2019, 5 pp.

Response to Examination Report dated Aug. 27, 2019, from counterpart European Application No. 16168659.7, filed Nov. 20, 2019, 14 pp.

\* cited by examiner

PRE-SINTERED PREFORM BRAZE FOR JOINING ALLOY CASTINGS

This application claims the benefit of U.S. Provisional Application No. 62/164,285 filed May 20, 2015, which is incorporated herein by reference in its entirety.

TECHNICAL FIELD

The present disclosure generally relates to brazes for joining alloy castings.

BACKGROUND

Some articles formed from superalloys include a single crystal and are formed using casting. When forming articles that are relatively large or include a relatively complex geometry, casting a single crystal may be difficult, leading to relatively high rejection rates due to defects in the cast article. For example, nozzle guide vanes for gas turbine engines may be cast as a single crystal, and this may restrict design complexity of the nozzle guide vanes.

SUMMARY

In some examples, the disclosure describes a method that includes positioning a first component comprising a first metal or alloy and a second component comprising a second metal or alloy to each other to define a joint region between adjacent portions of the first component and the second component. The method also may include positioning a pre-sintered preform (PSP) braze material in the joint region. The PSP braze material may include a wide gap braze material. The method further may include heating the PSP braze material to form a molten braze alloy and cooling the molten braze alloy to join the first and second components.

In some examples, the disclosure describes an assembly that includes a first component comprising a first metal or alloy and a second component comprising a second metal or alloy. The first component and second component may be positioned adjacent to each other to define a joint region between adjacent portions of the first component and the second component. The assembly also may include a pre-sintered preform (PSP) braze material disposed in the joint region and a heat source configured to heat the PSP braze material when the PSP braze material is disposed in the joint region.

The details of one or more examples are set forth in the accompanying drawings and the description below. Other features, objects, and advantages will be apparent from the description and drawings, and from the claims.

DETAILED DESCRIPTION

The disclosure describes assemblies, systems, and techniques for joining a first component including a metal or alloy and a second component including a metal or alloy using a pre-sintered preform (PSP) braze material. In some examples, the PSP braze material may include a wide gap braze material, and may include a powder that has been sintered to reduce porosity. The wide gap braze material may include a Ni-based wide gap braze material.

In some examples, braze foils have been formed using a melting spinning technique, which results in thin foils having an amorphous microstructure. Although melting spinning is suitable for many braze alloys, some of these braze alloys may possess mechanical and chemical properties (e.g., mechanical strength and high temperature oxidation resistance) that make the braze alloys unsuitable for use in high temperature oxidative environments. In contrast, the PSP braze materials described herein may, after brazing, result in alloys that have properties suitable for use in high temperature oxidative environments.

The PSP braze materials may include a nickel-based alloy or a cobalt-based alloy. In some examples, the PSP braze materials may include at least one of Al, Ti, Cr, W, Mo, Re, Ta, Si, B, or Fe, in addition to the base metal. The PSP braze materials may be used to join components that include a Ni-based alloy or a Co-based alloy.

Because the PSP braze materials may possess mechanical and chemical properties (e.g., mechanical strength and high temperature oxidation resistance) that make the braze alloys suitable for use in high temperature oxidative environments, the PSP braze materials may facilitate manufacture of articles for high temperature mechanical systems in multiple components, which are then joined using the PSP braze materials. This may reduce cost of manufacture due to lower defect levels in the components, facilitate more complex geometry, or the like. In some examples, the PSP braze materials also may provide advantages compared to powder braze materials. For example, the PSP braze materials may result in reduced porosity in the braze joint compared to braze joints formed using a powder, which may improve mechanical properties of the braze joint. Further, the PSP braze materials may be easier to position in the joint region and result in a more uniform braze joint.

Figure 1:
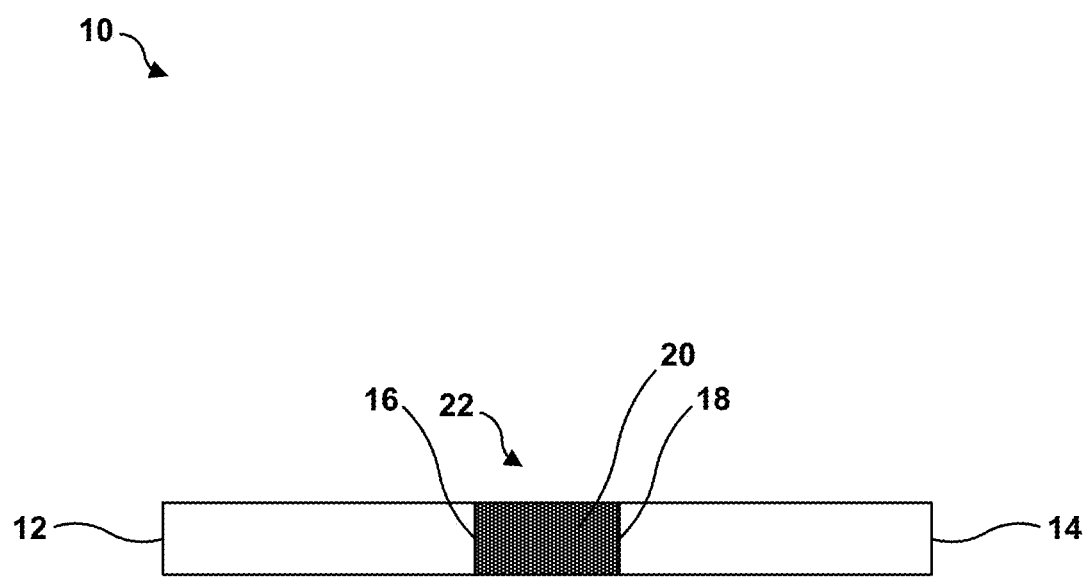
FIG. 1 is a conceptual and schematic diagram illustrating an example assembly for joining a first component including a metal or alloy and a second component including a metal or alloy using a pre-sintered preform (PSP) braze material.

FIG. 1 is a conceptual and schematic diagram illustrating an example assembly 10 for joining a first component 12 including a metal or alloy and a second component 14 including a metal or alloy using a pre-sintered preform (PSP) braze material 16. In some examples, first component 12 and second component 14 may be joined to form an article or a portion of an article that is part of a high temperature mechanical system. For example, first component 12 and second component 14 may be joined to form an article or a portion of nozzle guide vane (NGV) that is used in a high pressure or intermediate pressure stage in a gas turbine engine. In other examples, the article may include another component of a high temperature mechanical system, such as another component of a gas turbine engine. For example, the article may include a gas turbine engine blade, gas turbine engine vane, blade track, combustor liner, or the like.

Each of first component 12 and second component 14 may include a metal or alloy. In some examples, first component 12 and second component 14 include substantially the same (e.g., the same or nearly the same) metal or alloy. In other examples, first component 12 and second component 14 include different metals or alloys. In some examples, each of first component 12 and second component 14 may include a Ni-, Co-, Fe-based superalloy, or the like. First component 12 and second component 14 including a superalloy may include other additive elements to alter its mechanical and chemical properties, such as toughness, hardness, temperature stability, corrosion resistance, oxidation resistance, and the like, as is known in the art. Any useful superalloy may be utilized in first component 12 and second component 14, including, for example, Ni-based alloys available from Martin-Marietta Corp., Bethesda, Md., under the trade designation MAR-M246, MAR-M247; Ni-based alloys available from Cannon-Muskegon Corp., Muskegon, Mich., under the trade designations CMSX-3, CMSX-4, CMSX-10, and CM-186; Co-based alloys available from Martin-Marietta Corp., Bethesda, Md., under the trade designation MAR-M509; and the like. The compositions of CMSX-3 and CMSX-4 are shown below in Table 1.

TABLE 1

|    | CMSX-3 (wt. %) | CMSX-4 (wt. %) |
|----|----------------|----------------|
| Cr | 8              | 6.5            |
| Al | 5.6            | 5.6            |
| Ti | 1              | 1              |
| Co | 5              | 10             |
| W  | 8              | 6              |
| Mo | 0.6            | 0.6            |
| Ta | 6              | 6              |
| Hf | 0.1            | 0.1            |
| Re |                | 3              |
| Ni | Balance        | Balance        |

Each of first component 12 and second component 14 may be made using at least one of casting, forging, powder metallurgy, or additive manufacturing. In some examples, first component 12 and second component 14 are made using the same process, while in other examples, first component 12 and second component 14 are made using different processes.

Although FIG. 1 illustrates first component 12 and second component 14 as each defining a simple, substantially rectangular geometry, in other examples, first component part 12, second component 14, or both may define a more complex geometry, including simple or complex curves, overhangs, undercuts, internal cavities, or the like.

First component 12 defines at least one joint surface 16. Similarly, second component 14 defines at least one joint surface 18. In some examples, joint surfaces 16 and 18 may define complementary shapes. FIG. 1 illustrates joint surfaces 16 and 18 as substantially flat surfaces. In other examples, joint surfaces 16 and 18 may define other, more complex shapes, including, for example, simple or complex curves, overhangs, undercuts, apertures, annuluses, or the like.

First component 12 and second component 14 are positioned such that joint surfaces 16 and 18 are adjacent to each other and define a joint location 22. Joint location 22 may include any kind of simple or complex joint, including, for example, at least one of a bridle joint, a butt joint, a miter join, a dado joint, a groove joint, a tongue and groove joint, a mortise and tenon joint, a birdsmouth joint, a halved joint, a biscuit joint, a lap joint, a double lap joint, a dovetail joint, or a splice joint. Consequently, joint surfaces 16 and 18 may have any corresponding geometries to define the surfaces of the joint location 22. For example, for a mortise and tenon joint, first component 12 may define a mortise (a cavity) and second component 14 may define a tenon (a projection that inserts into the mortise). As another example, for a splice joint, first component 12 may define a half lap, a bevel lap, or the like, and second component 14 may define a complementary half lap bevel lap, or the like.

In some examples, although not shown in FIG. 1 assembly 10 may include a clamp, press, or other mechanism for exerting pressure between first joint surface 16 and second joint surface 18 during the brazing technique. The pressure between first joint surface 16 and second joint surface 18 may facilitate formation of the braze joint, e.g., by helping to at least one of maintain the gap of joint region 22, to promote flow of PSP braze material 20, and to evacuate any gases or porosity in PSP braze material 20, which reduces porosity in the braze joint.

Disposed in joint or joint location 22 is a PSP braze material 20. PSP braze material 20 may include a wide gap braze material. For example, PSP braze material 20 may include a powder mixture that has been sintered to form a pre-sintered preform. Sintering may reduce porosity compared to the powder, which may reduce porosity in joint region 22 during and after formation of the braze joint.

In some examples, PSP braze material 20 may include a Ni-based or Co-based wide gap braze alloy. PSP braze material 20 may include greater amounts of alloying elements that some other braze materials used in braze foils, which may contribute to improved mechanical properties, chemical properties, or both compared to some other braze materials used in braze foils. For example, PSP braze material 20 may possess sufficient mechanical strength and high temperature oxidation resistance to be used in a nozzle guide vane in a gas turbine engine.

In some examples, PSP braze material 20 may include both a braze alloy powder (a low-melt powder composition) and a superalloy powder (a high-melt powder composition). The low-melt alloy powder composition is an alloy, or a mixture of alloys, that substantially melts below the braze temperature (hence the name "low-melt" or "braze powder"). In contrast, the high-melt alloy powder composition is an alloy, or a mixture of alloys, that remains substantially unmelted at the braze temperature, because the composition has a melting temperature above the braze temperature (hence the name "high-melt" or "superalloy powder"). In some implementations, the braze alloy powder and the superalloy powder may have specific powder mesh sizes, and may be produced by induction melting the braze alloy or the superalloy powder, respectively, in vacuum or an argon atmosphere, followed by argon gas atomization. Each individual powder component used in PSP braze material 20 may be analyzed to confirm the particle size and chemical compositions.

In some examples, the low-melt powder composition includes an alloy or a mixture of alloys that melt at a temperature below about 1232° C. (about 2250° F.), with the alloy or mixture of alloys being selected so that the low-melt powder composition as a whole substantially melts at a temperature between about 1093° C. (about 2000° F.) and about 1204° C. (about 2200° F.). The high-melt alloy powder composition may include a single high-melt alloy or a mixture of alloys that melts at a temperature of greater than about 1315° C. (about 2400° F.).

In some examples, the low-melt powder composition may include one or more alloy powders and includes between about 50 wt. % and about 70 wt. % Ni, between about 8 wt. % and about 20 wt. % Cr, between about 8 wt. % and about 15 wt. % Ta, between about 4 wt. % and about 10 wt. % Co, between about 2 wt. % and about 7 wt. % Al, up to about 2.25 wt. % B, and up to about 2.25 wt. % Si, and has a compositional melting range of between about 1093° C. (about 2000° F.) and about 1204° C. (about 2200° F.). In some examples, the low-melt powder composition also includes up to about 1 wt. % each of at least one of Ti, W, Mo, Re, Nb, Hf, Pd, Pt, Ir, Ru, C, Si, P, Fe, Ce, La, Y, or Zr. In some examples the low-melt alloy powder comprises a mixture of two or more low-melt alloys. For example, a low-melt alloy powder may include (a) about 35% of a first low-melt powder including about 74 wt. % Ni, about 6 wt. % Cr, about 6 wt. % Al, about 12 wt. % Co, and about 2 wt. % B, with a liquidus temperature of about 1121° C. (about 2050° F.); (b) about 45% of a second low-melt powder including about 42 wt. % Ni, about 31 wt. % Cr, about 26 wt. % Ta, and about 1 wt. % B, with a liquidus temperature of about 1232° C. (about 2250° F.); and (c) about 20 wt. % of a third low-melt powder including about 64 wt. % Ni, about 6 wt. % Al, about 8 wt. % Co, about 4 wt. % W, about 4 wt. % Ta, about 3 wt. % Si, about 1 wt. % Re, about 1 wt. % Nb, and about 1 wt. % B, with a liquidus temperature of about 1093° C. (about 2000° F.).

In some examples, the high-melt powder composition may include an alloy or mixture of alloys with a chemistry that is the similar to or substantially the same (e.g., the same or nearly the same) as the alloy in first component 12, second component 14, or both. For example, in some implementations, to join a first component 12 and a second component 14 that include Ni-based superalloy components such as those made of MAR-M246 or 247, or CMSX-3 or -4, the high-melt powder composition may include between about 50 wt. % and about 70 wt. % Ni, between about 2 wt. % and about 10 wt. % Cr, between about 2 wt. % and about 10 wt. % Ta, between about 5 wt. % and about 15 wt. % Co, between about 2 wt. % and about 10 wt. % Al, between about 2 wt. % and about 10 wt. % W, between about 2 wt. % and about 4 wt. % Re, up to about 3 wt. % Mo, and up to about 3 wt. % Hf. In some examples, the high-melt powder composition also may include up to about 1 wt. % each of at least one of Ti, Nb, C, B, Si, or Zr. In some examples, the high-melt powder composition includes between about 55 wt. % and about 60 wt. % Ni, about 7 wt. % Cr, about 6 wt. % Ta, about 12 wt. % Co, about 6 wt. % Al, about 3 wt. % Re, about 1.5 wt. % Hf, and about 5 wt. % W.

The low-melt powder composition and the high-melt powder composition may be combined in any selected ratio. In some examples, PSP braze material 20 may include a powder mixture consisting of between about 20 wt. % and about 80 wt. % low-melt powder composition and a balance high-melt powder composition (a ratio of between about 1:4 and about 4:1 low-melt:high-melt powder). In some cases, braze alloy powder may be a mixture of more than one braze alloys which are all powder. In some examples, the ratio may be between about 1:3 and about 3:1 low-melt:high-melt powder, such as a ratio between about 1:2 and about 2:1 low-melt:high-melt powder, or a ratio between about 1:1 and about 1:1.5 low-melt:high-melt powder. For example, PSP braze material 20 may include between about 40 wt. % and about 50 wt. % low-melt alloy powder and between about 50 wt. % and about 60 wt. % high-melt powder, such as about 45 wt. % low-melt alloy powder and about 55 wt. % high-melt powder.

Hence, in some examples, PSP braze material 20 may include between about 50 wt. % and about 90 wt. % Ni, up to about 15 wt. % Cr, up to about 10 wt. % Ta, up to about 10 wt. % Co, up to about 7 wt. % Al, up to about 4 wt. % W, up to about 2 wt. % Re, up to about 1 wt. % Mo, up to about 1 wt. % Hf, and, optionally, up to about 0.5 wt. % Nb, up to about 3 wt. % Si, and up to about 3 wt. % B. In some examples, PSP braze material 20 may include between about 50 wt. % and about 70 wt. % Ni, between about 10 wt. % and about 15 wt. % Cr, between about 8 wt. % and about 10 wt. % Ta, between about 8 wt. % and about 10 wt. % Co, between about 4 wt. % and about 7 wt. % Al, between about 2 wt. % and about 4 wt. % W, between about 1 wt. % and about 2 wt. % Re, about 1 wt. % Mo, about 1 wt. % Hf, and, optionally, up to about 1% each at least one of Ti, Nb, Pd, Pt, Ir, Ru, C, B, Si, P, Mn, Fe, Ce, La, Y, or Zr. In some examples, PSP braze material 20 may include between about 50 wt. % and about 70 wt. % Ni, between about 10 wt. % and about 15 wt. % Cr, between about 8 wt. % and about 10 wt. % Ta, between about 8 wt. % and about 10 wt. % Co, between about 4 wt. % and about 7 wt. % Al, between about 2 wt. % and about 4 wt. % W, between about 1 wt. % and about 2 wt. % Re, between about 0.5 wt. % and about 1 wt. % Mo, between about 0.5 wt. % and about 1 wt. % Hf, between about 0.1 wt. % and about 0.5 wt. % Nb, between about 0.05 wt. % and about 3 wt. % Si, and between about 0.5 wt. % and about 2 wt. % B. In some examples, PSP braze material 20 may include about 58 wt. % Ni, about 11 wt. % Cr, about 9 wt. % Ta, about 9 wt. % Co, about 5 wt. % Al, about 3 wt. % W, about 1 wt. % Mo, about 1 wt. % Re, and about 1 wt. % Hf; or may include between about 10.2 wt. % and about 11.3 wt. % Cr, between about 4.8 wt. % and about 5.1 wt. % Al, between about 9.1 wt. % and about 9.8 wt. % Co, between about 2.8 wt. % and about 3.3 wt. % W, between about 0.7 wt. % and about 0.9 wt. % Mo, between about 8.2 wt. % and about 8.8 wt. % Ta, between about 0.6 wt. % and about 0.8 wt. % B, about 0.3 wt. % Si, between about 1.5 wt. % and about 1.8 wt. % Re, between about 0.8 wt. % and about 0.9 wt. % Hf, between about 0.1 wt. % and about 0.2 wt. % Nb, and a balance Ni.

In selecting the proportions of components used in PSP braze material 20, higher weight percentages of high-melt powder may provide better mechanical properties in view of their reduced levels of boron, silicon, or both. Conversely, higher percentages of low-melt powders may provide improved braze flow. A proper balance between mechanical properties and braze flow should be selected.

In some examples, PSP braze material 20 that includes higher Al content may possess improved high-temperature oxidation resistance properties compared to PSP braze material 20 with lower Al content. Further, increasing Ta content in PSP braze material 20 may improve mechanical properties of the braze joint compared to lower Ta content. In particular, Ta may strengthen the gamma and gamma prime phases by increasing lattice mismatches.

PSP braze material 20 may be formed by mixing an alloy powder or multiple alloy powders in a selected composition, then sintering the powder while disposed in a mold to form a sintered preform with reduced porosity. The sintering temperature and the duration of the sintering may depend at least in part on the composition of the alloy powder or multiple alloy powders.

In some examples, the sintered powder may then be cut or machined into a predetermined shape. For example, the predetermined shape may correspond to a shape of joint region 22. As described above, joint region 22 may include a relatively simple geometry as shown in FIG. 1, or may include a more complex geometry, e.g., multiple planes or surfaces, simple or complex curves, overhangs, undercuts, internal cavities, or the like. Accordingly, the sintered powder may be cut or machined into a relatively simple shape, or a more complex, e.g., including curvature, angles, apertures, or the like to form PSP braze material 20. Regardless of the complexity of the shape of PSP braze material 20 and depending upon the geometry of joint region 22, PSP braze material 20 may include a substantially two-dimensional shape (e.g., a plane) or a three-dimensional shape (e.g., including curvature, planes at angles with respect to one another, and the like).

In some examples, PSP braze material 20 may define a thickness (e.g., in the direction between first joint surface 16 and second joint surface 18) that is less than or equal to about 127 micrometers (about 0.005 inch). In some examples, PSP braze material 20 may define a thinner thickness, such as about 51 micrometers (about 0.002 inch). In other examples, PSP braze material 20 may define a greater thickness, such as up to about 1524 micrometers (about 0.060 inch), or about 1016 micrometers (about 0.040 inch).

By utilizing PSP braze material 20, alloys with desirable mechanical and chemical (e.g., high temperature oxidation resistance) may be utilized in a brazing technique to join first component 12 and second component 14. The resulting braze joint may possess sufficient mechanical strength and high temperature oxidation resistance to be utilized in a high temperature mechanical system, such as a nozzle guide vane in a gas turbine engine. Further, by utilizing a PSP, the braze joint may include reduced porosity compared to a joint formed using a braze powder, and positioning of the braze material may be easier and more precise than with a braze powder. In this way, PSP braze material 20 may facilitate using brazing to join components used in a high temperature mechanical system, which may allow formation of an article from multiple, smaller components, easing or reducing the cost of forming the article.

Figure 2:
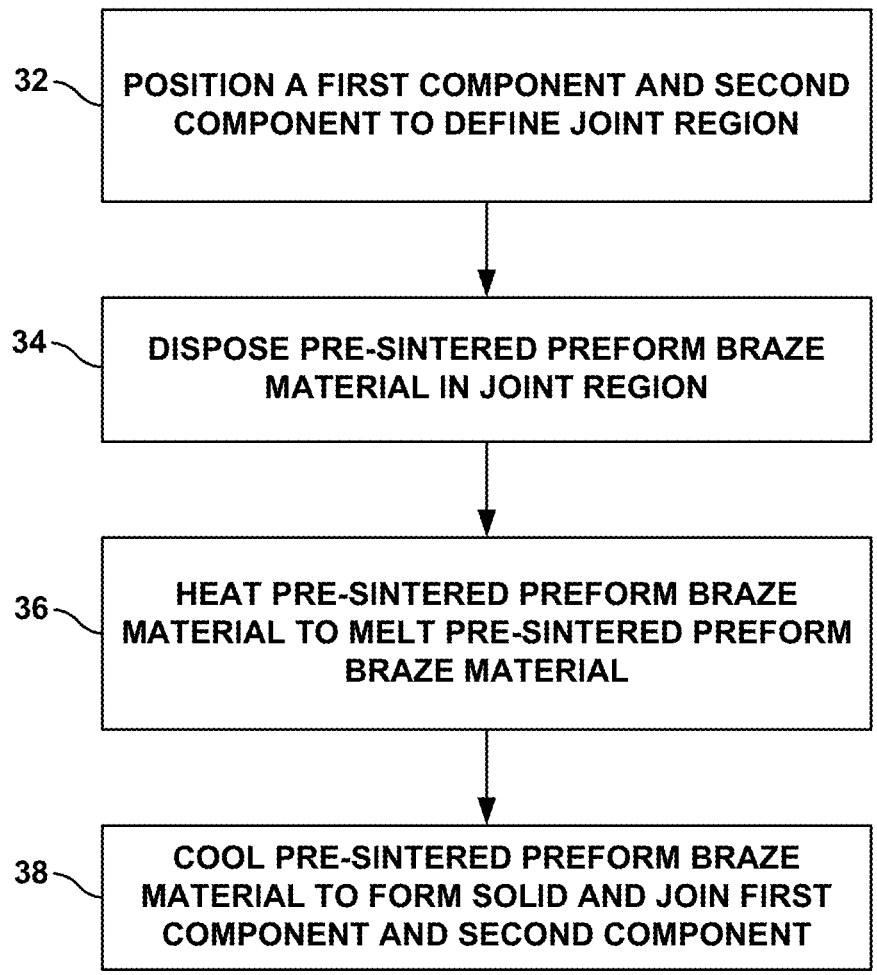
FIG. 2 is a flow diagram illustrating an example technique for joining a first component including a metal or alloy and a second component including a metal or alloy using a pre-sintered preform (PSP) braze material.

FIG. 2 is a flow diagram illustrating an example technique for joining a first component including a metal or alloy and a second component including a metal or alloy using a pre-sintered preform (PSP) braze material. The technique of FIG. 2 will be described with reference to assembly 10 of FIG. 1 for purposes of illustration only. It will be appreciated that the technique of FIG. 2 may be performed with a different assembly, or that assembly 10 may be used in a different brazing technique.

Although not shown in FIG. 2, in some examples, prior to positioning first component 12 and second component 14 to define joint region 22 (32), first joint surface 16 and second joint surface 18 of first and second component 12 and 14, respectively, may be inspected and cleaned. This cleaned joint surfaces 16 and 18 may produce a stronger braze joint than uncleaned joint surfaces.

The technique of FIG. 2 includes positioning first component 12 and second component 14 to define joint region 22 (32). For example, as shown in FIG. 1, first component 12 and the second component 14 may be positioned so that joint surfaces 16 and 18 are near each other. As describe above, the geometry of joint region 22 may depend on the type of joint defined by joint surfaces 16 and 18 and may include, for example, a bridle joint, a butt joint, a scarf joint, a miter join, a dado joint, a groove joint, a tongue and groove joint, a mortise and tenon joint, a birdsmouth joint, a halved joint, a biscuit joint, a lap joint, a double lap joint, a dovetail joint, or a splice joint.

The technique of FIG. 2 also include disposing PSP braze material 20 in joint region 22 (34). As described above, PSP braze material 20 may define a predetermined shape that at least partially corresponds to the geometry of joint region 22. As joint region 22 may include a relatively simple geometry or a more complex geometry, PSP braze material 20 may be cut or machined into a relatively simple shape, or a more complex shape, e.g., including curvature, angles, apertures, or the like. PSP braze material 20 may be disposed in joint region 22 such that surface of PSP braze material 20 contact joint surfaces 16 and 18. In some examples, a clamp, press, or other mechanism may be used to compress PSP braze material 20 between joint surfaces 16 and 18 to cause intimate contact between joint surfaces 16 and 18 and surfaces of PSP braze material 20.

The technique of FIG. 2 further includes heating PSP braze material 20 to melt at least part of PSP braze material (36). In some examples, PSP braze material 20 may be heated in a furnace or other closed retort, and first component 12 and second component 14 may be heated with PSP braze material 20. In some examples, the furnace or closed retort may enclose a vacuum or substantially inert atmosphere (e.g., an atmosphere including constituents that substantially do not react with components 12 and 14 and PSP braze material 20 at the temperatures and pressures experienced by the interior of the furnace or closed retort). In some examples, PSP braze material 20 may be heated at a braze temperature of between about 1093° C. (about 2000° F.) and about 1288° C. (about 2350° F.), such as a braze temperatures of about 1260° C. (about 2300° F.). The time for which PSP braze material 20 is heated at the braze temperature may vary from about 10 minutes to about 60 minutes, for example between about 20 to 30 minutes.

Regardless of the heat treatment used for melting PSP braze material 20 (36), PSP braze material 20 may be allowed to cool to ambient temperature to form a solid and join first component 12 and second component 14 (38). For example, PSP braze material 20 may be cooled in a vacuum or inert gas furnace to about 650° C. (about 1200° F.) at a rate that is slow enough to avoid thermal distortion, followed by cooled under flowing inert gas to about 65° C. (about 150° F.) or less.

Following the brazing technique illustrated in FIG. 2, the article including first component 12 and second component 14 joined by PSP braze material 20 may optionally be subjected to a diffusion heat treatment cycle to homogenize joint region 22. For example, the diffusion heat treatment may be performed at temperatures between about 0° C. (about 0° F.) and about 222° C. (about 400° F.) below the braze temperature (e.g., below the highest braze temperature used in a stepped heat treatment), and for times of up to about 24 hours. For example, the post-brazing diffusion heat treatment cycle may include a stepped diffusion heat treatment cycle at a temperature of about 1149° C. (about 2100° F. for about 1 hour to about 18 hours. In some examples, during the diffusion heat treatment, the article including first component 12 and second component 14 joined by PSP braze material 20 is disposed in a vacuum or inert atmosphere.

In some examples, the stepped diffusion heat treatment cycle may include heating the article including PSP braze material 20, first component 12, and second component 14 at a rate of between about 11° C./minute (about 20° F./minute) and about 22° C./minute (about 40° F./minute) to a first temperature of between about 982° C. (about 1800° F.) and about 1093° C. (about 2000° F.). In some examples, the article may be held at the first temperature for about 30 minutes to about 4 hours. The stepped heat treatment may also include heating the article to a second temperature of between about 1038° C. (about 1900° F.) and about 1149° C. (about 2100° F.) at a rate of between about 5.6° C./minute (about 10° F./minute) and about 16.7° C./minute (about 30° F./minute). The article may be held at the second temperature for between about 1 hour and about 4 hours. In some examples, the stepped heat treatment further includes heating the article to a third temperature of between about 1066° C. (about 1950° F.) and about 1177° C. (about 2150° F.) at a rate of between about 2.8° C./minute (about 5° F./minute) and about 11° C./minute (about 20° F./minute). The article may be held at the third temperature for between about 1 hour and about 4 hours. The stepped heat treatment also may include heating the article to a fourth temperature of between about 1093° C. (about 2000° F.) and about 1204° C. (about 2200° F.) at a rate of between about 2.8° C./minute (about 5° F./minute) and about 11° C./minute (about 20° F./minute). The article may be held at the fourth temperature for between about 6 hours and about 24 hours.

In some examples, the article may be heated at a rate of about 16.7° C./minute (about 30° F./minute) a first temperature of about 1038° C. (about 1900° F.) and held at about 1038° C. for about 1 hour to about 2 hours. The article then may be heated to a second temperature of about 1093° C. (about 2000° F.) at a rate of about 11° C./minute (about 20° F./minute) and held at about 1093° C. for about 1 hour to about 2 hours. The article then may be heated to a third temperature of about 1121° C. (about 2050° F.) at a rate of about 5.6° C./minute (about 10° F./minute) and held at about 1121° C. for about 1 hour to about 2 hours. The article then may be heated to a fourth temperature of about 1149° C. (about 2100° F.) at rate of about 5.6° C./minute (about 10° F./minute) and held at about 1149° C. for about 1 hour to about 18 hours.

Figure 3:
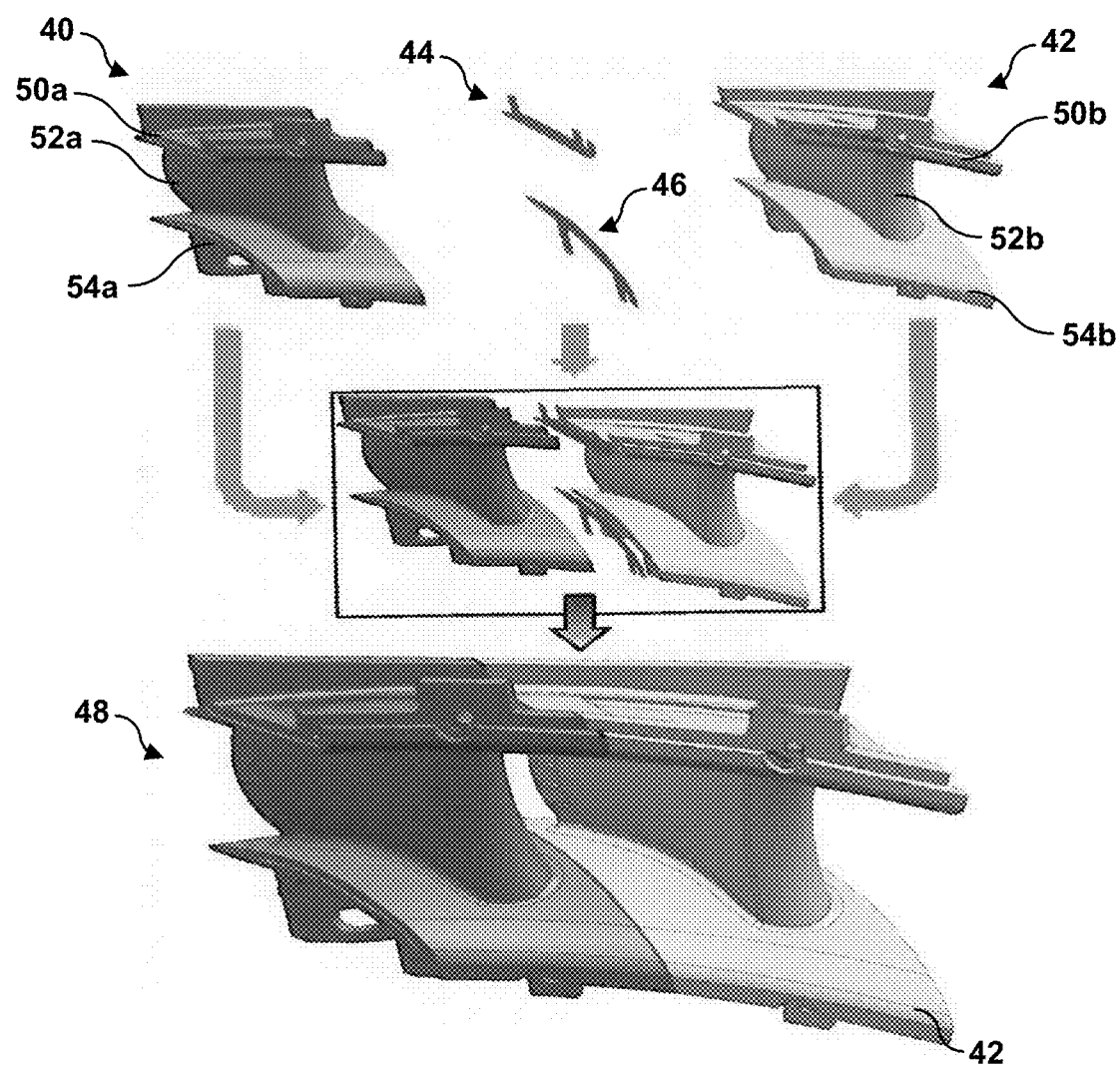
FIG. 3 is a conceptual and schematic diagram illustrating an example first component including a metal or alloy, an example second component including a metal or alloy, and example pre-sintered preform braze materials used to form a joined article.

Although FIG. 1 illustrates a simplified conceptual and schematic view of an example first component 12, an example second component 14, and an example PSP braze material 20, in other example, at least one of first component 12, second component 14, and PSP braze material 20 may define a more complicated geometry. For example, FIG. 3 is a conceptual and schematic diagram illustrating an example first component 40 including a metal or alloy, an example second component 42 including a metal or alloy, and example PSP braze materials 44, 46 used to form an article 48. In the example illustrated in FIG. 3, first component 40 includes a nozzle guide vane (NGV) for a gas turbine engine, second component 42 includes a NGV for a gas turbine engine, and article 48 includes a doublet NGV. First component 40 includes an outer platform 50a, an inner platform 54a, and an airfoil 52a that may be cast as a single, integral piece. Similarly, second component 42 includes an outer platform 50b, an inner platform 54b, and an airfoil 52b that may be cast as a single, integral piece. Each of first and second components 40 and 42 may be formed of a metal or alloy, such as a Ni- or Co-based superalloy. Further, first and second components 40 and 42 may be formed of the same metal or alloy, or first component 40 may be formed of a different alloy than second component 42.

As shown in FIG. 3, the joints between first component 40 and second component 42 are defined by outer platforms 50a and 50b and by inner platforms 54a and 54b. The joints possess a more complex geometry than that shown in FIG. 1. First PSP braze material 44 and second PSP braze material 46 accordingly include a more complex geometry, shaped to substantially conform to the geometry of the respective joints in which first PSP braze material 44 and second PSP braze material 46 are positioned. Upon completion of the brazing technique, first PSP braze material 44 joins outer platforms 50a and 50b and second PSP braze material 46 joins inner platforms 54a and 54b. In this way, PSP braze materials 44 and 46 are used to join two simpler components, first and second components 40 and 42, to form an article 48 with a more complex geometry. This may reduce manufacturing time and cost compared to forming article 48 from a single casting.

Figure 4:
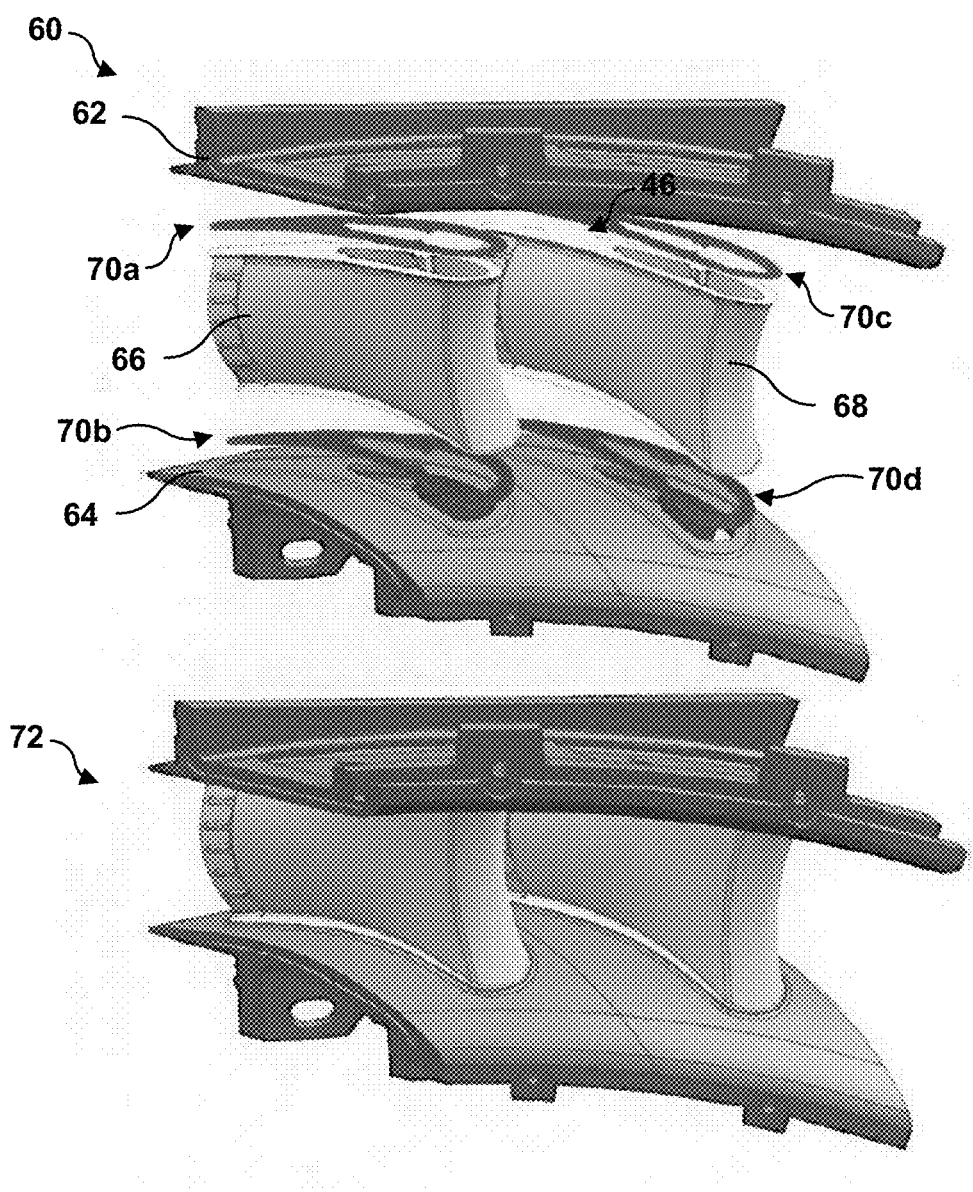
FIG. 4 is a conceptual and schematic diagram illustrating examples components including a metal or alloy and example pre-sintered preform braze materials used to form a joined article.

FIG. 4 is a conceptual and schematic diagram illustrating other example components including a metal or alloy and example PSP braze materials used to form a joined article. In the example illustrated in FIG. 4, first component 62 includes an outer platform of a doublet NGV for a gas turbine engine, second component 64 includes an inner platform of the doublet NGV, third component 66 includes a first airfoil for the doublet NGV, and fourth component 68 includes a second airfoil for the doublet NGV. Each of first component 62, second component 64, third component 66, and fourth component 68 may be formed as a respective single, integral piece. Each of first component 62, second component 64, third component 66, and fourth component 68 may be formed of a metal or alloy, such as a Ni- or Co-based superalloy. Further, first component 62, second component 64, third component 66, and fourth component 68 may be formed of the same metal or alloy, or at least one of first component 62, second component 64, third component 66, and fourth component 68 may be formed of a different alloy than at least one other of first component 62, second component 64, third component 66, and fourth component 68.

As shown in FIG. 4, the joints between first component 62 and third component 66, between first component 62 and fourth component 68, between second component 64 and third component 66, and between second component 64 and fourth component 68 possess a more complex geometry than that shown in FIG. 1. First PSP braze material 70a, second PSP braze material 70b, third PSP braze material 70c, and fourth PSP braze material 70d accordingly include more complex geometries, shaped to substantially conform to the geometry of the respective joints in which first PSP braze material 70a, second PSP braze material 70b, third PSP braze material 70c, and fourth PSP braze material 70d are positioned. Upon completion of the brazing technique, first PSP braze material 70a joins first component 62 and third component 66, second PSP braze material 70b joins second component 64 and third component 66, third PSP braze material 70c joins first component 62 and fourth component 68, and fourth PSP braze material 70d joins second component 64 and fourth component 68. In this way, PSP braze materials 70a-70d are used to a plurality of simpler components to form an article 72 with a more complex geometry. This may reduce manufacturing time and cost compared to forming article 72 from a single casting.

EXAMPLES

Example 1

Figure 5:
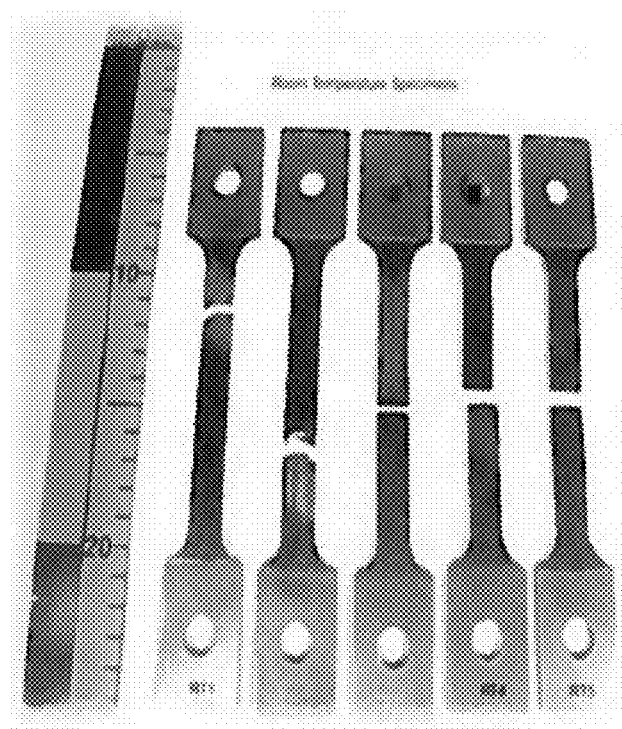
FIG. 5 is a photograph illustrating example tensile test specimens including two components joined using pre-sintered preform braze materials after room temperature tensile stress testing.

FIG. 5 is a photograph illustrating example tensile test specimens including two components joined using pre-sintered preform braze materials after room temperature tensile stress testing. Each of the test samples were made of two portions of CMSX-3 base alloy joined by a PSP braze material. As described above, CMSX-3 has a composition of about 8 wt. % Cr, about 5.6 wt. % Al, about 1 wt. % Ti, about 5 wt. % Co, about 8 wt. % W, about 0.6 wt. % Mo, about 6 wt. % Ta, and about 0.1 wt. % Hf, and a balance Ni. The PSP braze material in this Example included a composition of about 10.2 wt. % Cr, about 5.1 wt. % Al, about 9.8 wt. % Co, about 3.3 wt. % W, about 0.9 wt. % Mo, about 8.2 wt. % Ta, about 0.6 wt. % B, about 0.3 wt. % Si, about 0.1 wt. % Re, and about 0.9 wt. % Hf, about 0.2 wt. % Nb, and a balance Ni.

Each sample had an original geometry in the narrow region of about 0.5 inch wide by about 0.170 inch thick.

Tensile tests were performed on the samples shown in FIG. 5 at room temperature. Each sample was exposed to a strain of up to about 8.5% at a rate of about 0.005 inch/inch/minute per ASTM E-8 using a tensile mechanical testing machine. As shown in FIG. 5, the left-most two samples failed in the base metal rather than the braze joint. For the other three samples, although the braze joint failed, the tensile properties of the braze joints were between about 70% and 100% of the tensile properties of the CMSX-3 base material, as shown in Table 2.

TABLE 2

| Sample | Ultimate Tensile Strength (kilo-pounds per square inch) | Elongation (%) | Reduction of Area (%) | Failure Location |
|---|---|---|---|---|
| 1 | 110.9 | 4.2 | 19.9 | Base material |
| 2 | 116.0 | 2.2 | 1.2 | Base material |
| 3 | 111.2 | 8.5 | 4.7 | Braze joint |
| 4 | 118.5 | 1.1 | 5.2 | Braze joint |
| 5 | 113.8 | 0 | 0 | Braze joint |
| Average | 114.1 | 3.2 | 6.2 | |

Example 2

Figure 6:
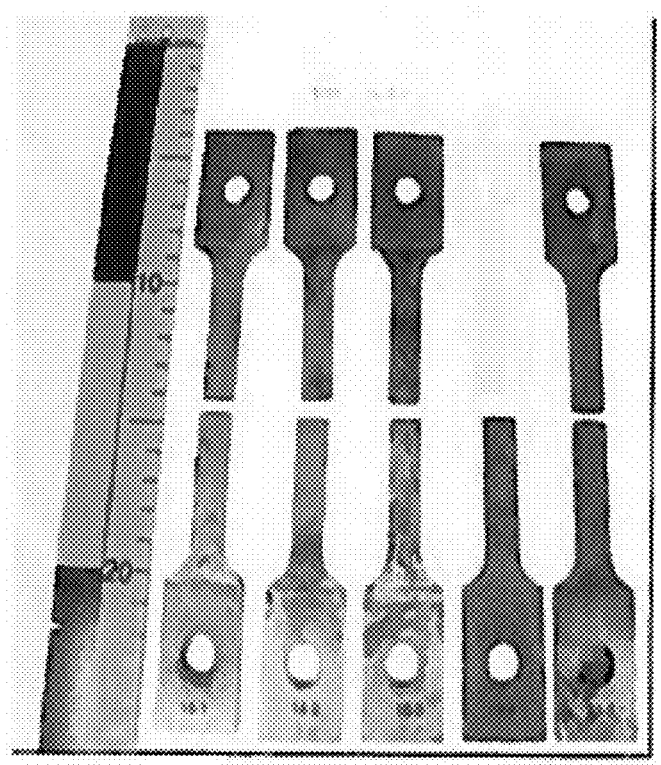
FIG. 6 is a photograph illustrating example tensile test specimens including two components joined using pre-sintered preform braze materials after high temperature tensile stress testing.

FIG. 6 is a photograph illustrating example tensile test specimens including two components joined using pre-sintered preform braze materials after high temperature tensile stress testing. Each of the test samples were made of two portions of CMSX-3 base alloy joined by a PSP braze material. As described above, CMSX-3 has a composition of about 8 wt. % Cr, about 5.6 wt. % Al, about 1 wt. % Ti, about 5 wt. % Co, about 8 wt. % W, about 0.6 wt. % Mo, about 6 wt. % Ta, and about 0.1 wt. % Hf, and a balance Ni. The PSP braze material in this Example included a composition of about 10.2 wt. % Cr, about 5.1 wt. % Al, about 9.8 wt. % Co, about 3.3 wt. % W, about 0.9 wt. % Mo, about 8.2 wt. % Ta, about 0.6 wt. % B, about 0.3 wt. % Si, about 0.1 wt. % Re, and about 0.9 wt. % Hf, about 0.2 wt. % Nb, and a balance Ni.

Each sample had an original geometry in the narrow region of about 0.5 inch wide by about 0.170 inch thick.

Tensile tests were performed on the samples shown in FIG. 6 at an elevated temperature of about 982° C. (about 1800° F.). Each sample was exposed to a strain of up to about 0.5% at a rate of about 0.005 inch/inch/minute per ASTM E-8 using a tensile mechanical testing machine. As shown in FIG. 6, each of the samples failed at the braze joint. Although the braze joint failed, the tensile properties of the braze joints were between about 70% and 100% of the tensile properties of the CMSX-3 base material at the elevated temperature, as shown in Table 3.

TABLE 3

| Sample | Ultimate Tensile Strength (kilo-pounds per square inch) | Elongation (%) | Reduction of Area (%) | Failure Location |
|---|---|---|---|---|
| 1 | 81.3 | 0.1 | 0.2 | Braze joint |
| 2 | 72.5 | 0.3 | 0.0 | Braze joint |
| 3 | 90.9 | 0.2 | 0.6 | Braze joint |
| 4 | 79.1 | 0.5 | 0.0 | Braze joint |
| Average | 81.0 | 0.3 | 0.2 | |

Various examples have been described. These and other examples are within the scope of the following claims.

What is claimed is:

1. A method comprising:
   positioning a first component comprising a first metal or alloy and a second component comprising a second metal or alloy to each other to define a joint region between adjacent portions of the first component and the second component;
   positioning a pre-sintered preform (PSP) braze material in the joint region, wherein the PSP braze material comprises a wide gap braze material comprising between about 50 wt. % and about 90 wt. % Ni, between about 10.2 wt. % and about 11.3 wt. % Cr, between about 4.8 wt. % and about 5.1 wt. % Al, between about 9.1 wt. % and about 9.8 wt. % Co, between about 2.8 wt. % and about 3.3 wt. % W, between about 0.7 wt. % and about 0.9 wt. % Mo, between 8.2 wt. % and about 8.8 wt. % Ta, between about 0.6 wt. % and about 0.8 wt. % B, about 0.3 wt. % Si, between about 1.5 wt. % and about 1.8 wt. % Re, and between about 0.8 wt. % and about 0.9 wt. % Hf, and between about 0.1 wt. % and about 0.2 wt. % Nb;
   heating the PSP braze material to form a molten braze alloy; and
   cooling the molten braze alloy to join the first and second components.

2. The method of claim 1, wherein the PSP braze material comprises about 58 wt. % Ni, about 11 wt. % Cr, about 9 wt. % Ta, about 9 wt. % Co, about 5 wt. % Al, about 3 wt. % W, about 1 wt. % Mo, about 1 wt. % Re, and about 1 wt. % Hf.

3. The method of claim 1, wherein the PSP braze material further comprises up to about 1 wt. % each of at least one of Ti, Nb, Pd, Pt, Ir, Ru, C, P, Mn, Fe, Ce, La, Y, or Zr.

4. The method of claim 1, wherein the PSP braze material comprises a low-melt powder composition and a high-melt powder composition, and wherein the low-melt powder composition comprises between about 50 wt. % and about 70 wt. % Ni, between about 8 wt. % and about 20 wt. % Cr, between about 8 wt. % and about 15 wt. % Ta, between about 4 wt. % and about 10 wt. % Co, between about 2 wt. % and about 7 wt. % Al, and up to about 2.25 wt. % B.

5. The method of claim 4, wherein the low-melt powder composition further comprises up to about 1 wt. % each of at least one of Ti, W, Mo, Re, Nb, Hf, Pd, Pt, Ir, Ru, C, Si, P, Mn, Fe, Ce, La, Y or Zr.

6. The method of claim 1, wherein the PSP braze material comprises a low-melt powder composition and a high-melt powder composition, and wherein the high-melt powder composition comprises between about 50 wt. % and about 70 wt. % Ni, between about 2 wt. % and about 10 wt. % Cr, between about 2 wt. % and about 10 wt. % Ta, between about 5 wt. % and about 15 wt. % Co, between about 2 wt. % and about 10 wt. % Al, between about 2 wt. % and about 10 wt. % W, up to about 3 wt. % Re, up to about 3 wt. % Mo, and up to about 3 wt. % Hf.

7. The method of claim 1, wherein the first metal or alloy comprises a Ni-based or a Co-based superalloy, and wherein the second metal or alloy comprises a Ni-based or a Co-based superalloy.

8. The method of claim 1, wherein heating the PSP braze material to form the molten braze alloy comprises heating the first component, the second component, and the PSP braze material in a vacuum furnace at a temperature between about 1093° C. and about 1260° C.

9. The method of claim 1, further comprising, after cooling the molten braze alloy to join the first and second components, heat treating the first and second components using a stepped diffusion cycle by at least heating the first and second components to about 1038° C. for about 1 hour to about 2 hours; heating the first and second components to about 1093° for about 1 hour to about 2 hours; heating the first and second components to about 1121° C. for about 1 hour to about 2 hours; heating the first and second components to about 1149° C. for about 1 hour to about 18 hours; and cooling the first and second components to room temperature.

10. An assembly comprising:
a first component comprising a first metal or alloy;
a second component comprising a second metal or alloy, wherein the first component and second component are positioned adjacent to each other to define a joint region between adjacent portions of the first component and the second component;
a pre-sintered preform (PSP) braze material disposed in the joint region, wherein the PSP braze material comprises a wide gap braze material comprising between about 50 wt. % and about 90 wt. % Ni, between about 10.2 wt. % and about 11.3 wt. % Cr, between about 4.8 wt. % and about 5.1 wt. % Al, between about 9.1 wt. % and about 9.8 wt. % Co, between about 2.8 wt. % and about 3.3 wt. % W, between about 0.7 wt. % and about 0.9 wt. % Mo, between about 8.2 wt. % and about 8.8 wt. % Ta, between about 0.6 wt. % and about 0.8 wt. % B, about 0.3 wt. % Si, between about 1.5 wt. % and about 1.8 wt. % Re, and between about 0.8 wt. % and about 0.9 wt. % Hf, and between about 0.1 wt. % and about 0.2 wt. % Nb; and
a heat source configured to heat the PSP braze material when the PSP braze material is disposed in the joint region.

11. The assembly of claim 10, wherein the PSP braze material comprises about 58 wt. % Ni, about 11 wt. % Cr, about 9 wt. % Ta, about 9 wt. % Co, about 5 wt. % Al, about 3 wt. % W, about 1 wt. % Mo, about 1 wt. % Re, and about 1 wt. % Hf.

12. The assembly of claim 10, wherein the PSP braze material further comprises up to about 1 wt. % each of at least one of Ti, Nb, Pd, Pt, Ir, Ru, C, P, Mn, Fe, Ce, La, Y, or Zr.

13. The assembly of claim 10, wherein the PSP braze material comprises a low-melt powder composition and a high-melt powder composition, and wherein the low-melt powder composition comprises between about 50 wt. % and about 70 wt. % Ni, between about 8 wt. % and about 20 wt. % Cr, between about 8 wt. % and about 15 wt. % Ta, between about 4 wt. % and about 10 wt. % Co, between about 2 wt. % and about 7 wt. % Al, and up to about 2.25 wt. % B.

14. The assembly of claim 13, wherein the low-melt powder composition further comprises up to about 1 wt. % each of at least one of Ti, W, Mo, Re, Nb, Hf, Pd, Pt, Ir, Ru, C, Si, P, Mn, Fe, Ce, La, Y, or Zr.

15. The assembly of claim 10, wherein the PSP braze material comprises a low-melt powder composition and a high-melt powder composition, and wherein the high-melt powder composition comprises between about 50 wt. % and about 70 wt. % Ni, between about 2 wt. % and about 10 wt. % Cr, between about 2 wt. % and about 10 wt. % Ta, between about 5 wt. % and about 15 wt. % Co, between about 2 wt. % and about 10 wt. % Al, between about 2 wt. % and about 10 wt. % W, up to about 3 wt. % Re, up to about 3 wt. % Mo, and up to about 3 wt. % Hf.

16. The assembly of claim 10, wherein the first metal or alloy comprises a Ni-based or a Co-based superalloy, and wherein the second metal or alloy comprises a Ni-based or a Co-based superalloy.

17. The method of claim 1, wherein at least a portion of the joint region comprises at least one of a bridle joint, a butt joint, a miter joint, a dado joint, a groove joint, a tongue and groove joint, a mortise and tenon joint, a birdsmouth joint, a halved joint, a biscuit joint, a lap joint, a double lap joint, a dovetail joint, or a splice joint.

18. The assembly of claim 10,
wherein at least a portion of the joint region comprises at least one of a bridle joint, a butt joint, a miter joint, a dado joint, a groove joint, a tongue and groove joint, a mortise and tenon joint, a birdsmouth joint, a halved joint, a biscuit joint, a lap joint, a double lap joint, a dovetail joint, or a splice joint,
wherein the portion of the first component comprises a first surface,
wherein the portion of the second component defines a second surface, and
wherein the assembly is configured to exert pressure between the first surface and the second surface.

19. A method comprising:
positioning a first component comprising a first metal or alloy and a second component comprising a second metal or alloy to each other to define a joint region between adjacent portions of the first component and the second component;
positioning a pre-sintered preform (PSP) braze material in the joint region,
wherein the PSP braze material comprises a low-melt powder composition and a high-melt powder composition defining a wide gap braze material comprising between about 50 wt. % and about 90 wt. % Ni, up to about 15 wt. % Cr, up to about 10 wt. % Ta, up to about 10 wt. % Co, up to about 7 wt. % Al, between about 2 wt. % and about 4 wt. % W, up to about 2 wt. % Re, up to about 1 wt. % Mo, up to about 1 wt. % Hf, up to about 0.5 wt. % Nb, up to about 3.0 wt. % Si, and up to about 3 wt. % B,
wherein the low-melt powder composition comprises between about 50 wt. % and about 70 wt. % Ni, between about 8 wt. % and about 20 wt. % Cr, between about 8 wt. % and about 15 wt. % Ta, between about 4 wt. % and about 10 wt. % Co, between about 2 wt. % and about 7 wt. % Al, and up to about 2.25 wt. % B; and heating the PSP braze material to form a molten braze alloy; and cooling the molten braze alloy to join the first and second components.

* * * * *